United States Patent [19]

Peterson

[11] 3,784,252

[45] Jan. 8, 1974

[54] SEAT BACK ADJUSTMENT MECHANISM FOR BABY PRODUCTS

[75] Inventor: Arnold E. Peterson, Glendale, Calif.

[73] Assignee: Peterson Baby Products Co., North Hollywood, Calif.

[22] Filed: Dec. 27, 1971

[21] Appl. No.: 212,212

[52] U.S. Cl. ............... 297/364, 297/355, 297/379, 292/6, 280/36
[51] Int. Cl. .............................................. B60n 1/02
[58] Field of Search ................... 297/363, 364, 355, 297/379; 292/6, 7; 280/36; 312/218, 215

[56] References Cited
UNITED STATES PATENTS

| | | | |
|---|---|---|---|
| 136,009 | 2/1873 | Schwaab | 297/364 |
| 2,592,025 | 4/1952 | Gray | 280/36 B X |
| 2,543,167 | 2/1951 | Hening et al. | 297/364 X |
| 3,556,546 | 1/1971 | Garner | 280/36 B |
| 2,090,376 | 8/1937 | Russell | 297/364 |
| 3,115,365 | 12/1963 | Hershberger et al. | 297/364 X |
| 2,515,261 | 7/1950 | Poskin | 297/364 |
| 1,224,982 | 5/1917 | Washeim | 297/365 |
| 2,041,447 | 5/1936 | Woody | 292/7 |

Primary Examiner—Bernard A. Gelak
Assistant Examiner—Peter A. Aschenbrenner
Attorney—Spensley, Horn & Lubitz

[57] ABSTRACT

An improved seat back adjustment mechanism for baby products such as strollers and the like having a positive engagement and being easily operable even with the baby in the stroller. The mechanism is in part comprised of a sector plate mounted to the frame of the stroller at each side of the lower portion of the back of the seat, with each sector plate having a first hole therein receiving a pin coupled to the back of the seat to provide pivotal support for the back, and a plurality of additional holes distributed in an arc about the pivot hole. A lever member is pivotally attached to the lower portion of the seat back, with engaging members pivotally attached thereto and projecting outward through members attached to the seat back so as to be engageable with any of the holes in the sector members. A coil spring is connected to the lever member to encourage the lever member to a position whereby the engaging members are in an extended position, with an actuating member attached to one of the engaging members to provide a convenient means of actuating the mechanism for adjustment of the position of the back.

4 Claims, 5 Drawing Figures

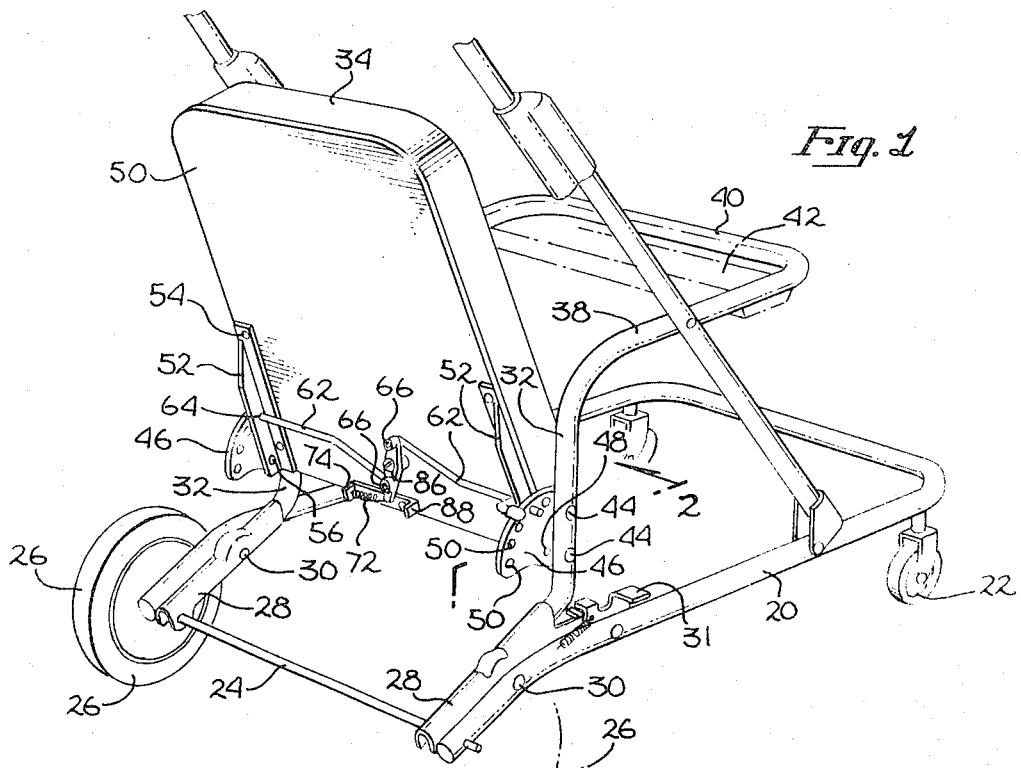
Fig. 1
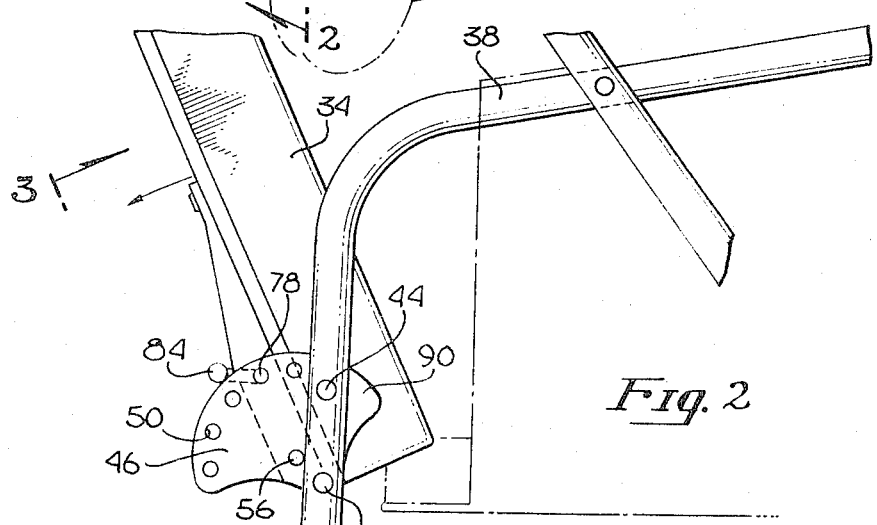
Fig. 2
ARNOLD E. PETERSON
INVENTOR.
BY
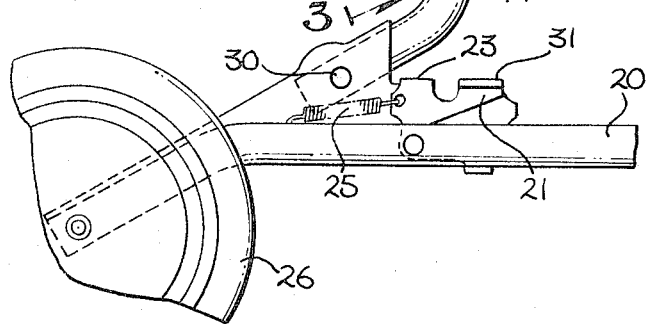
ATTORNEYS

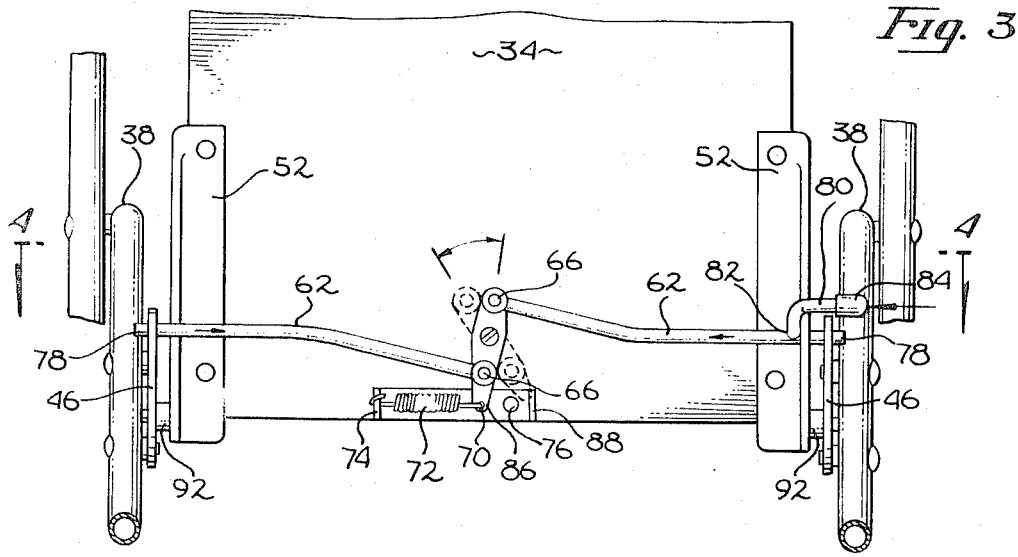
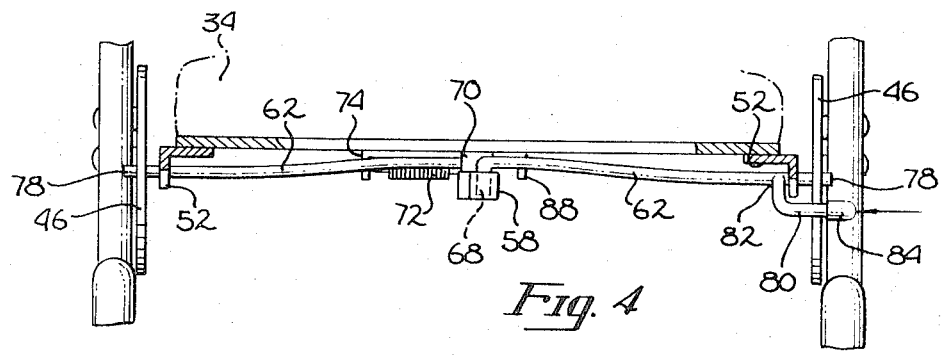
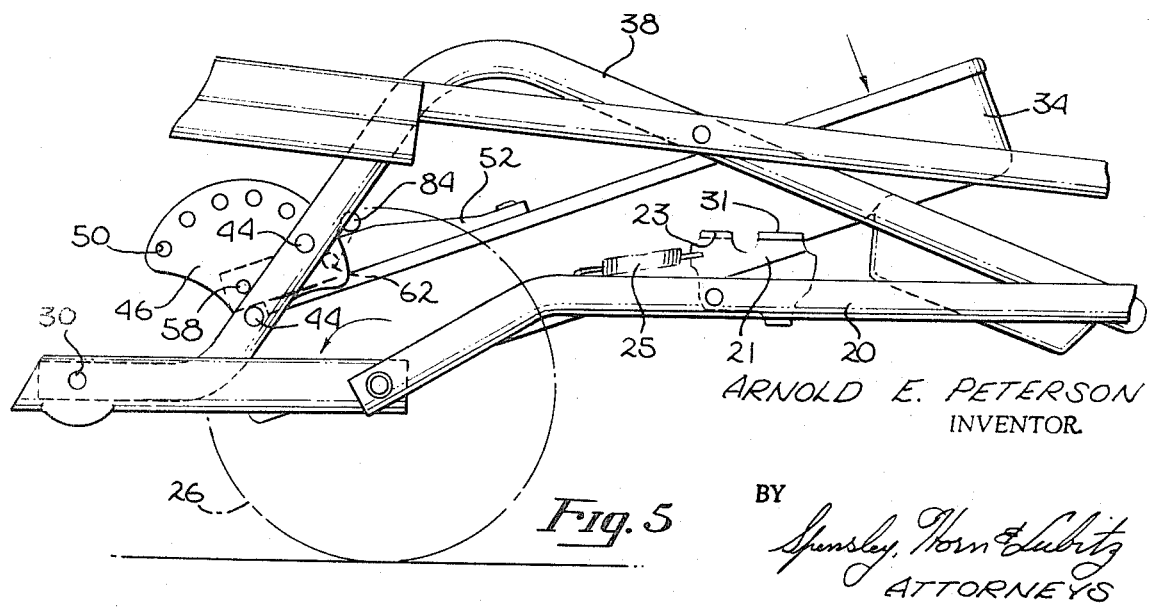

SEAT BACK ADJUSTMENT MECHANISM FOR BABY PRODUCTS

BACKGROUND OF THE INVENTION

1. Field of the Invention.

This invention relates to the field of baby products such as strollers and the like.

2. Prior Art.

Various types of collapsible or folding baby strollers are well known in the prior art. In substantially all of such strollers the back of the seat forming a back rest for the baby is adjustable so as to provide a back rest for the baby while sitting up and to be adjustable to positions of various backward inclinations, including a substantially horizontal position, to allow the baby to lie down. The adjustable back is further useful in folding the stroller and is generally adapted to allow the back of the seat to pivot forward so that it may lie flat across the top of the folded stroller.

In U.S. Pat. No. 3480290 entitled Collapsible Baby Stroller, issued Nov. 25, 1969, there is disclosed a prior art adjustment mechanism for the back of the seat in a collapsible baby stroller. The back of the seat, in the vicinity of the lower edge thereof, contains outward projecting, cylindrical members which fit into elongated holes in special side plates attached to the frame of the stroller. On each side of the lower portion of the back, the two side plates have an upper surface defining a plurality of indentations for receiving an engaging member therein, and such an engagimg member is attached to the back of the seat, generally above the pivot members. Thus, by generally lifting the back of the seat, the pivot members may be caused to slide in the elongated holes in the side members and the engaging member lifted upward out of engagement with the indentations on the top surface of the side members. Thereafter, the back of the seat may be rotated to the next desired position and allowed to move downward again, thereby reengaging the engaging members with the indentations on the top of the side plates to retain the back in that position.

The above described back adjustment apparatus is by far the most commonly used apparatus in the prior art and is thoroughly disclosed in other patents, such as U.S. Pat. No. 2788730 entitled Adjustable Baby Stroller, U.S. Pat. No. 3184249 entitled Collapsible Baby Stroller, and U.S. Pat. No. 3084949 entitled Folding Stroller with Telescopic Member.

The prior art back adjustment mechanism has a number of problems and disadvantages which make desirable the invention of an improved adjustment apparatus. Some of these problems and disadvantages result from the mechanism itself, whereas others result from the manner in which the machanism is incorporated in the general design of the stroller and the manner in which strollers are commonly used.

It will be noted that the upper surface of the side plate has a number of indentations for receiving an engaging member and therefore, this upper surface is defined by a number of upward-projecting, finger-like members between the indentations. These upward-projecting, finger-like members have no support at the tops thereof and, consequently, must have sufficient strength to provide resistance to an engaging member engaging the indentations and further, to prevent the bending of the finger-like members in the event the back is positioned so that the engaging members are forced downward against the top of the finger-like members. As a result, the finger-like members are generally very broad, thereby limiting the number of indentations therebetween. By way of example, in all of the above referenced patents, the back is adjustable to only three specific positions (in addition to the folded forward position).

In general, the fabric covering the seat portion of the stroller is integral with the fabric covering the back of the seat, or is in some manner attached to the back. This also may be seen in all of the above referenced patents. Thus, at leat part of the weight of the baby is transferred by this fabric to the back and is supported either through the engaging members, or through the pivot members, by the side plates. Consequently, if a baby is in the stroller, considerably upward force must be exerted on the back of the seat to lift the back so that the engaging members no longer engage the indentations on the top of the side plates, and the inclination of the back may be adjusted. This is true whether the child is leaning back against the back or is leaning forward to relieve the fore and aft pressure on the back. Furthermore, if the back inclination is adjusted to certain positions, the engaging members will come to rest not locked in the indentations of the side members, but instead resting precarisously on top of the upward-extending, finger-like members, and will deceptively appear to be locked or retained in that position because of the downward force exerted thereon by the weight of the child. Thus, the back may at any time thereafter suddenly swing backward, sometimes merely into the next indentation in the side members and sometimes passing thereover to move from a substantially upright position to the substantially level position, almost instantly and without warning. In this regard it should be noted that it is common practice, when crossing a street and approaching a curb, to tilt the entire stroller backward so as to cause the front wheels of the stroller to rise to sidewalk level. Clearly, if the back adjustment mechanism is not firmly engaged, the back may suddenly fall to a downward tilting position, because of the orientation of the stroller, thereby allowing the child to fall to a head-down position or even to tumble head first out of the stroller.

Another disadvantages of the prior art back adjustment mechanism is that it presents a potential hazard to childrens' fingers while being adjusted or in the event of slippage, as hereabove described. Strollers are generally designed to be reasonably rugged and durable because of the abuse of frequent folding and of potential use with children of considerable weight. Consequently, the indentations in the top of the side plates are generally, as large or larger than a small child's finger and, therefore, a child may be very seriously pinched either as a result of the back pivoting backward or because of the weight of the child forcing down on the engaging member to pinch the finger.

Consequently, it may be seen that there is a need for an improved back adjustment mechanism which will lock with certainty in a plurality of positions, preferably more than three, which if left between locked positions will automatically lock itself in the next position without passing therethrough, and which does not present openings, indentations and the like of sufficient size to receive a child's finger.

BRIEF SUMMARY OF THE INVENTION

An improved seat back adjustment mechanism for baby products such as strollers and the like having a positive engagement and being easily operable even with a baby in the stroller. The mechanism is comprised of a sector plate mounted to the frame of the stroller at each side of the lower portion of the back of the seat and an engaging mechanism on the back of the seat. The two sector plates each have a hole adjacent to the apex thereof for receiving a pin coupled to the back of the seat so as to provide a pivot for the back. The arc of each sector plate contains a plurality of holes for selectively receiving an engaging member guided with respect to the back of the seat. A lever member is pivotally attached to the lower portion of the back near the center thereof and the engaging members are pivotally joined to the lever member on opposite sides of the axis of rotation of that member. A coil spring also connects to the lever member to encourage the lever member to a position whereby the engaging members are in an extended position to pass through selected holes in the sector members. An actuating member is attached to one of the engaging members and projects outward beyond the circumference of one of the sector members to provide a convenient means of actuating the mechanism for adjustment of the position of the back.

BRIEF DESCRIPTION OF THE DRAWINGS

FIG. 1 is the perspective view of a portion of a prior art collapsible baby stroller.

FIG. 2 is a side view taken along lines 2—2 of FIG. 1.

FIG. 3 is a rear view of the seat back and portion of the stroller frame taken along lines 3—3 of FIG. 2.

FIG. 4 is a partial cross section taken along lines 4—4 of FIG. 3.

FIG. 5 is a partial side view of the stroller of FIG. 1 in the folded position.

DETAILED DESCRIPTION OF THE INVENTION

First referring to FIG. 1, a rear perspective view of a portion of a prior art collapsible baby stroller incorporating the back adjustment mechanism of the present invention may be seen. The collapsible stroller is substantially that disclosed in my prior U.S. Pat. No. 3,480.290 entitled Collapsible Baby Stroller, hereinbefore referred to. The frame of the stroller is generally fabricated from chrome plates steel tubing. The lower frame member 20 extends forward to support the caster-like front wheels 22 and rearward to support axle 24 and the rear wheels 26. Members 28 are also connected to axle 24 adjacent member 20 and each are pivotally connected by pins 30 to the lower ends of upward extending members 32 adjacent to each side of the back of the seat 34. A locking mechanism, generally comprised of a catch 31, is pivotally attached to lower frame member 20. A protruding member 23, integral with members 28 (FIG. 5) and a coil spring 25 for engaging catch 21 into engagement with protruding member 23, locks the stroller in the unfolded condition. The upward extending members 32 are bent forward and integrally connected at front 40 generally forward and above the seat 36, so as to form a retaining structure for the child sitting in the seat 38 and to further provide a support for tray 42.

Attached to each of the upward-extending members 32 by two rivets 44 are sector plates 46. The sector plates are disposed substantially parallel to each other, and are referred to as sector plates in the general sense as a result of each of them having a central hole 48 and a plurality of holes 50 disposed along the arc of a circle having its center at the center of hole 48.

Fastened to each side of the lower portion of the back surface 50 of seat back 34 are angled members 52 which are attached to seat back 34 by means of rivets 54. The angle members 52 have an outward extending pivot 56 riveted thereto and disposed so as to project outward to holes 48 in the sector members 46, so as to provide pivotal support for the seat back 34.

Fastened to the center of the seat back by screw 58 is a lever member 60 adapted for rotation about an axis substantially perpendicular to the plane of the seat back. Engaging bars 62 are generally fabricated of heavy wire and disposed between lever member 60 and sector plates 46, being guided adjacent their outer ends by holes 64 in member 52, and being bent rearward at their inner ends to project rearward through cooperatively disposed holes 66 in the lever member 58. This may also be seen in FIGS. 3 and 4. Thus in FIG. 4, the inner ends 68 of one of the engaging members 62 can be seen in phantom in lever member 58. It will be noted that the lever member 58 is spaced adjacent its hub or axis or rotation by an integral, cylindrical region 70, which allows passage of engaging members 62 between the region of the lever containing holes 66 and the seat back, but prevents the engaging member 62 from withdrawing from holes 66 in the lever. Thus, the inner ends of engaging member 62 are retained after assembly by the engagement of the ends 68 of the engaging members with holes 66 in lever 58 and no further locking or retention is required.

The lower end of lever 58 extends below the lever hole 66 and has a further hole 70 therein for engagement by coil spring 72 supported by a shallow U-shaped member 74, which is riveted by rivets 76 to the seat back 34. The coil spring 72, normally under some tension, urges lever 58 into the position shown, with engaging members 62 being urged thereby into the extended position so that the outer ends 78 of the engaging members may project through the cooperatively disposed holes in the sector plates 46. To prevent the excessive extension of engaging member 62 and to further provide a convenient and readily accessible means of actuating the seat back adjustment mechanism, an actuating member 80 is welded to one of the engaging members 62 in the are generally indicated by the number 82. The actuating member 80 interferes with the corresponding angle member 52 so as to prevent the further extension of actuating member 62 by coil spring 72. The outer end of the actuating member 80 has an enlarged plastic end cap 84 extending outward beyond the outer radius of the associated sector plate 46 in a convenient location for ease of actuation by a person using the stroller. When the plastic cap 84 is pushed in the direction indicated by the arrow, the right-hand engaging member 62 moves to the left, withdrawing the end 78 thereof from the hole in the sector plate. The motion of the engaging member 62 also causes lever number 58 to rotate, thereby simultaneously causing the left-hand engaging member d62 to also withdraw from the hole in the left-hand sector plate. The motion is resisted by coil spring 72, and overrotation of lever 58 so as to withdraw the ends 78 of engaging members 62 from the guide holes in angle members 52 is prevented by the interference of the lower end 86 of lever 58 with the rearward projecting end 88 of the U-shaped member 74. In this regard it is to be noted that plastic spacers 92 (FIG. 3) are used to space angle members 52 from sector plates 46 so as to prevent rubbing therebetween due to minor misalignments and further to provide a reasonable tolerance on the motion of the engaging members whereby disengagement with the sector plates 46 without disengagement with the angle members 52 is assured.

Now referring to FIG. 2, a side view of a portion of the stroller of FIG. 1 may be seen. The sector plates 46 contain a plurality of holes 50 distributed about the arc of a circle from a position approximately level with and rearward of pivot end 56 to a position generally directly above pivot pin 56 so as to provide adjustability of the seat back from a substantially vertical position to a substantially horizontal position. Sector plate 46 also contains a somewhat forward projecting protrusion 90 which does not contain any additional holes in the circular arc. Thus, when actuating member 80 is pushed in so that the engaging members 62 no longer engage any holes 50 in the sector plates, the seat back 34 may be tilted forward, as shown in FIG. 5, so as to allow the folding of the stroller. With the seat tilted forward, the seat back lies against tray 42, and the ends 78 of the actuating members 62 rest against the flat projection 90 of the sector members, thereby holding the actuating members in the withdrawn position and allowing the easy unfolding of the stroller and raising of the seat back to a substantially vertical position. In this position, coil spring 72 will cause the actuating members 62 to snap into the first set of holes in the sector member 46. In this regard, the elastic characteristics of coil spring 72 and the proportions of lever 58 are chosen such that even an attempted rapid motion of the seat back 34 to a rearward position without pushing against actuating member 80 will not allow the seat to move backward beyond the next set of holes in the sector plates 46, at which time the coil spring 72 will force the engaging members 62 rapidly outward into the holes in the sector plates.

The advantages of the present invention on seat back adjustment apparatus are manifold. Since any downward force on the set back is supported by the pivot members 56, a downward force on the seat back will not cause the seat back to effectively appear locked, if in fact it is not locked in position. Thus, even with a child in the stroller, the seat back may be adjusted easily and may be tested easily with a fore and aft force on the top of the seat back to be assured of the locking of the engaging members 62 with the holes in the sector plates. Furthermore, if the seat back is in a position between holes in the sector plate, the seat back may easily be rotated unitl the engaging members snap into the holes in the sector plates, thereby giving a readily audible indication of the locking of the seat back. In the event that a user still fails to lock the seat back at a given position, but instead leaves the seat back between holes in the sector plate, the seat back may not fall all the way backward, either as a result of the motion of the child or a shift in weight of the child because of tilting the stroller to cross a curb or the like, but instead will simply fall back until the engaging members 62 snap into the next set of holes in the sector plates. Thus, locking of the present invention of adjustment apparatus is easier and more certain than in the prior art apparatus, and the consequences of failing to lock the apparatus are much less. Also, the engaging members are fabricated of 3/16 inch diameter steel wire and thus, the holes in the sector plates in the preferred embodiment are ¼ inch in diameter to make hole alignment somewhat less critical and yet to maintain the hole diameters generally too small for a child's finger. Furthermore, the outer circumference of the sector plate is smooth and therefore, a child's finger may not be caught and pinched between the sector plate and angle member 52. Furthermore, if a child attempts to put his finger through a hole in the sector plate from the outside, the engaging action of the engaging members will simply push his finger out of the hole rather than to pinch the finer therein. These and other advantages of the present invention seat back adjustment apparatus have been achieved without significant change in cost of the mechanism over the prior art mechanism. Of course, modification of the present invention mechanism, such as the alternate placement of the coil spring and the alternate placement or configuration for the actuating member by way of example are within the contemplation of the present invention. Also, while the present invention seat back has been described in detail herein with relation to a specific baby product for purposes of example, it is to be understood that the seat back adjustment mechanism of the present invention may be used on other baby products such as walker jumpers, platform jumpers, high chairs and other products using adjustable backs. Thus, while the invention has particularly been shown with reference to a preferred embodiment thereof, it will be understood by those skilled in the art that various changes in form and detail may be made therein without departing from the spirit and scope of the invention.

I claim:

1. In a baby supporting device having a seat, a seat back and a frame, a seat back adjustment mechanism comprising:

first means coupled to said frame at each side of the lower portion of said seat back, each of said fist means having a plurality of openings therein disposed along an arc of a circle;

second means coupled to each side of the lower portion of said seat back adjacent corresponding ones of said first means;

pivot means extending between each of said first means and the adjacent one of said second means, and pivotally connecting said first and second means for rotation about the center of said arc of said circle;

lever means rotatably attached to said seat back and adapted for rotation about an axis substantially perpendicular to said seat back;

engaging means for each of said first means, said engaging means being rotatably coupled to said lever means, at positions radially displaced from said axis of rotation of said lever means, said positions being generally diametrically opposite each other, each of said engaging means being guided by one of said second means, and being engageable in any of said plurality of openings in the adjacent said first means when said lever means is in a first angular position, said engaging means being retractable from engagement with said openings in said first means by rotation of said lever means to a second angular position; and spring means to elastically urge said lever means into said first angular position:

a stop means, said stop means being cooperatively disposed with respect to said lever means so as to stop the rotation of said lever means when being rotated from said first angular position to said second angular position, and an actuating means, said actuating means being attached to one of said engaging means between said lever means and one of said second means and projecting past the corresponding said second means so as to be accessible to an operator at the side of the stroller, said actuating means further acting as a stop means as said lever means rotates from said second angular position to said first angular position by the interference of said actuating means and the respective one of said second means.

2. A seat back adjustment mechanism for a baby supporting appratus having a seat, a seat back, and a frame comprising:

first and second sector plates disposed in substantial prallelism adjacent each side of the lower portion of the seat back and each supported by said frame, each of said sector plates having a plurality of holes therein disposed in an arc of a circle;

first and second sheet metal back support members each attached to one side of the lower portion of said back and partially extending adjacent and substantially parallel to said first and second sector plates respectively;

a pair of pivot members, each of said pivot members rotatably coupling one of said sector plates and an adjacent one of said back support members for rotation of said seat back about the center of said arc of said circle;

a lever rotatably mounted to the back of said seat back and adapted for rotation about an axis substantially perpendicular to said seat back;

first and second generally horizontal engagement rods, each having first and second ends, said first engagement rod being slideably supported by said first back support member adjacent its first end so as to engageable into any of the plurality of holes in said first sector plates and pivotally supported at its second end by said lever generally above said axis of rotation of said lever, said second engagement rod being slideably supported by said second back support member adjacent its first and so as to be engageable into any of the plurality of holes in said second sector plate and pivotally supported at its second end by said lever generally below said axis of rotation of said lever, and a shallow U-shaped member having a base and two legs fastened to said seat back by said base, said U-shaped member being disposed with respect to said lever so that one of said legs provides a stop to said lever when rotating from said first position to said second position, said spring being fastened between said lever and the other of said legs, wherby said lever may be rotated between a first position with said engagement rods engaging a pair of said plurality of holes in said sector plates and a second position with said engagement rods withdrawn from said last named holes, and a spring coupled to said lever and to said seat back to elastically urge said lever to said first position.

3. The back adjustment mechanism of claim 2 further comprised of an actuating member, said actuating member being welded to one of said engagement rods between said lever and one of said back support members and projecting past the associated one of said sector plates so as to be accessible to an operator at the side of the stroller, said actuating member further acting as a stop means as said lever rotates from said second position to said first position.

4. The back adjustment mechanism of claim 2 wherein said lever is spaced outward from said seat back by an integral hub thereon and said engagement rods have an approximately 90° bend adjacent their second ends so that the said second ends project rearward substantially perpendicular to said seat back, said second ends protruding into holes in said lever and being retained therein by said lever and said seat back.

* * * * *